United States Patent
Vajapeyam

(10) Patent No.: US 9,483,318 B2
(45) Date of Patent: Nov. 1, 2016

(54) DISTRIBUTED PROCEDURE EXECUTION IN MULTI-CORE PROCESSORS

(71) Applicant: EMPIRE TECHNOLOGY DEVELOPMENT LLC, Wilmington, DE (US)

(72) Inventor: Sriram Vajapeyam, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/371,322

(22) PCT Filed: Dec. 20, 2013

(86) PCT No.: PCT/US2013/077031
§ 371 (c)(1),
(2) Date: Jul. 9, 2014

(87) PCT Pub. No.: WO2015/065500
PCT Pub. Date: May 7, 2015

(65) Prior Publication Data
US 2015/0220369 A1   Aug. 6, 2015

(30) Foreign Application Priority Data

Oct. 28, 2013   (IN) ........................... 4831/CHE/2013

(51) Int. Cl.
*G06F 9/46* (2006.01)
*G06F 9/50* (2006.01)
*G06F 9/48* (2006.01)

(52) U.S. Cl.
CPC ........... *G06F 9/5088* (2013.01); *G06F 9/4843* (2013.01); *G06F 9/4881* (2013.01); *G06F 9/5066* (2013.01)

(58) Field of Classification Search
None
See application file for complete search history.

(56) References Cited

U.S. PATENT DOCUMENTS

| 5,655,096 A | 8/1997 | Branigin |
| 6,665,793 B1* | 12/2003 | Zahir .................. G06F 9/30123 711/132 |
| 7,281,123 B2* | 10/2007 | Kissell .................... G06F 8/441 712/228 |
| 7,769,962 B2* | 8/2010 | Kasuya ................. G06F 9/4843 711/147 |
| 7,779,230 B2 | 8/2010 | Balakrishnan et al. |
| 8,539,159 B2* | 9/2013 | Chauvel .............. G06F 12/0253 711/117 |

(Continued)

OTHER PUBLICATIONS

Balakrishnan, S. et al., "Program Demultiplexing: Data-flow based Speculative Parallelization of Methods in Sequential Programs," International Symposium on Computer Architecture, Jun. 2006, pp. 302-313.

(Continued)

*Primary Examiner* — Jason Mitchell
(74) *Attorney, Agent, or Firm* — Moritt Hock & Hamroff LLP; Steven S. Rubin, Esq.

(57) ABSTRACT

Technologies are generally described for methods and systems effective to execute a program in a multi-core processor. In an example, methods to execute a program in a multi-core processor may include executing a first procedure on a first core of a multi-core processor. The methods may further include while executing the first procedure, sending a first and second instruction, from the first core to a second and third core, respectively. The instructions may command the cores to execute second and third procedures. The methods may further include executing the first procedure on the first core while executing the second procedure on the second core and executing the third procedure on the third core.

22 Claims, 9 Drawing Sheets

(56) References Cited

U.S. PATENT DOCUMENTS

| | | | |
|---|---|---|---|
| 9,015,689 B2* | 4/2015 | Bai | G06F 8/433 717/157 |
| 2003/0110012 A1 | 6/2003 | Orenstien et al. | |
| 2004/0123201 A1 | 6/2004 | Nguyen et al. | |
| 2007/0220495 A1 | 9/2007 | Chen et al. | |
| 2007/0245120 A1* | 10/2007 | Chang | G06F 9/30145 712/10 |
| 2007/0255909 A1* | 11/2007 | Gschwind | G06F 12/0269 711/147 |
| 2007/0294581 A1* | 12/2007 | Dean | G06F 9/5027 714/33 |
| 2009/0089764 A1 | 4/2009 | Lai et al. | |
| 2010/0268912 A1 | 10/2010 | Conte et al. | |
| 2010/0287556 A1 | 11/2010 | Munz | |
| 2012/0137075 A1* | 5/2012 | Vorbach | G06F 9/526 711/122 |

OTHER PUBLICATIONS

Koopman Jr., P. J., "Modern Stack Computer Architecture," Harris Semiconductor, System Design and Network Architecture Conference, May 8-10, 1990, pp. 153-164.

Goldstein, S. C. et al., "Lazy Threads: Implementing a Fast Parallel Call," Journal of Parallel and Distributed Computing (JPDC), 1996, pp. 5-20, vol. 37.

"Java processor," Accessed at http://web.archive.org/web/20130204142509/http://en.wikipedia.org/wiki/Java_processor, Accessed on Jul. 8, 2014, pp. 3.

Frigo, M., "The Design and Implementation of Cilk 4," MIT, May 20, 1966, pp. 2.

Frigo, M., "The Thorny Problem of the Cactus Stack," posted on Oct. 28, 2009, Accessed at http://web.archive.org/web/20110626061635/http://software.intel.com/en-us/articles/the-thorny-problem-of-the-cactus-stack/, Accessed on Jul. 8, 2014, pp. 3.

International Search Report for International Patent Application No. PCT/US2013/077031 mailed May 30, 2014, 7 pages.

Azuelos, N., "An Integrated Functional Solution for Multi-core Programming on The Cell Broadband Engine," Department of Electrical & Computer Engineering McGill University, Jan. 2009, pp. 95.

Allen, M. D., "Data-Driven Decomposition of Sequential Programs for Determinate Parallel Execution," University of Wisconsin at Madison Madison, 2010, pp. 240.

\* cited by examiner

800 A computer program product.

802 A signal bearing medium.

804

At least one of

One or more instructions for a method to execute a program, where the program includes a first procedure, a second procedure, and a third procedure, the method comprising: or One or more instructions for executing the first procedure on a first core of a multi-core processor; or One or more instructions for while executing the first procedure, sending a first instruction, from the first core to a second core of the multi-core processor, where the first instruction commands the second core to execute the second procedure; or One or more instructions for receiving the first instruction at the second core executing the first procedure on the first core while executing the second procedure on the second core; or One or more instructions for while executing the first procedure and the second procedure, sending a second instruction, from the first core to a third core of the multi-core processor, where the second instruction commands the third core to execute the third procedure; or One or more instructions for receiving the second instruction at the third core; or One or more instructions for executing the third procedure on the third core while executing the first procedure on the first core and the second procedure on the second core.

806 A computer-readable medium

808 A recordable medium

810 A communications medium

Fig. 8

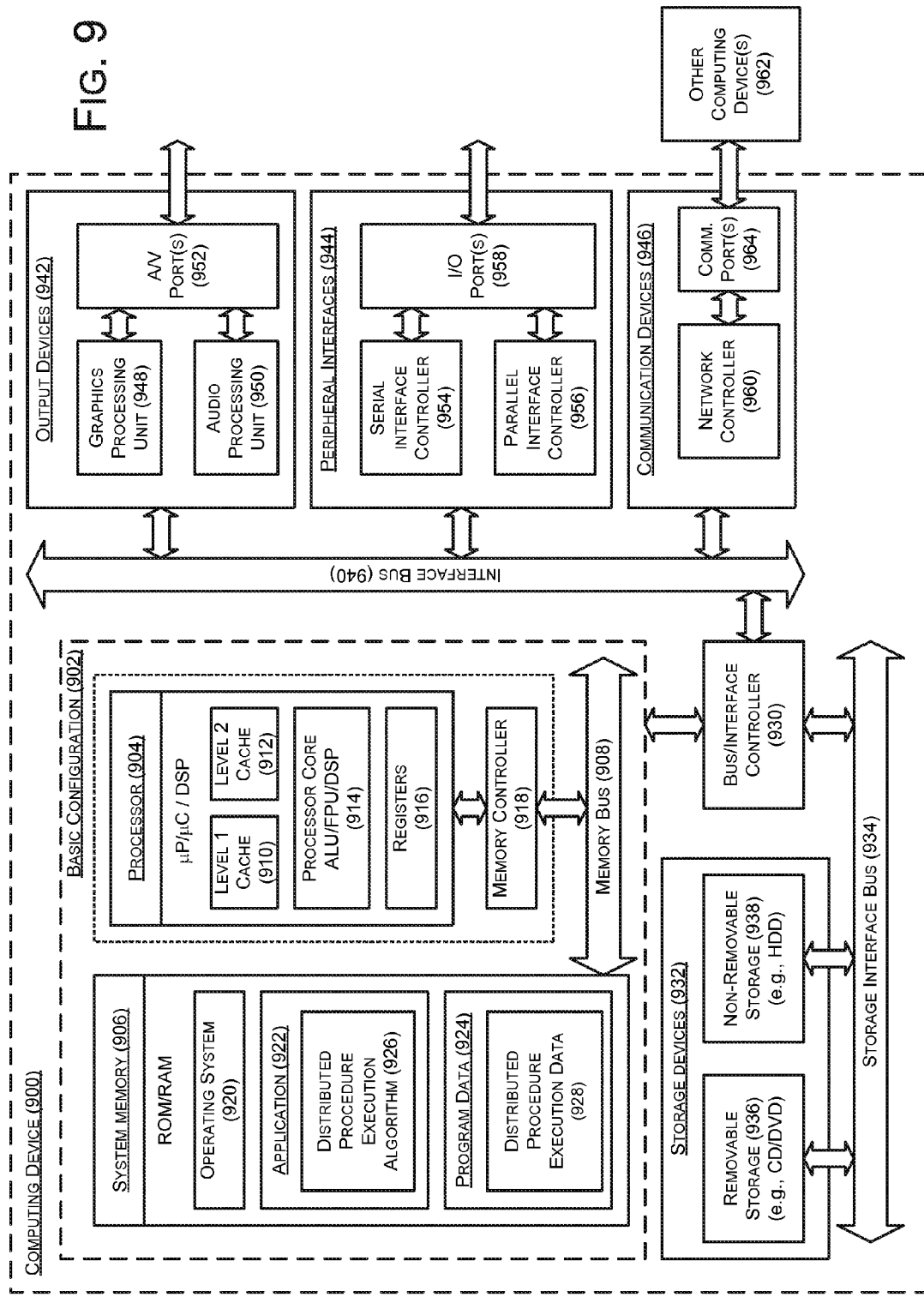

DISTRIBUTED PROCEDURE EXECUTION IN MULTI-CORE PROCESSORS

CROSS-REFERENCE TO RELATED APPLICATIONS

This application is the U.S. National Stage filing under 35 U.S.C. 371 of International Application No. PCT/US13/77031, filed Dec. 20, 2013 ("International Application"), where the International Application claims priority under 35 U.S.C. §119(a) to Indian Patent Application 4831/CHE/2013, filed Oct. 28, 2013 ("Indian Patent Application"). The disclosure of the International Application and the Indian Patent Application are hereby incorporated by reference in their entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die/chip. Each processor may be provided with a private cache that stores data for the processor. There may also exist other caches that are shared by multiple processors. As a single piece of data may be stored in multiple private and shared caches, a cache coherence protocol may be configured to keep track of the data stored in multiple caches. The cache coherence protocol may be configured to help ensure that multiple requests for data consistently result in the appropriate latest versions of the same data being returned. One or more programs, which may utilize or generate at least some of the data, may be executed on one or more of the cores.

SUMMARY

In some examples, methods to execute a program are generally described. The program may include a first procedure, a second procedure and a third procedure. The methods may include executing the first procedure on a first core of a multi-core processor. The methods may further include, while executing the first procedure, sending a first instruction, from the first core to a second core of the multi-core processor. The first instruction may command the second core to execute the second procedure. The methods may include receiving the first instruction at the second core. The methods may include executing the first procedure on the first core while executing the second procedure on the second core. The methods may further include, while executing the first procedure and the second procedure, sending a second instruction, from the first core to a third core of the multi-core processor. The second instruction may command the third core to execute the third procedure. The methods may further include receiving the second instruction at the third core. The methods may include executing the third procedure on the third core while executing the first procedure on the first core and the second procedure on the second core.

In some examples, a multi-core processor effective to execute a program is generally described. The program may include a first procedure, a second procedure and a third procedure. The multi-core processor may include a first core. The first core may be effective to execute the first procedure. The first core may be further effective to send a first instruction, during execution of the first procedure, from the first core to a second core of the multi-core processor. The first instruction may command the second core to execute the second procedure. The first core may be effective to send a send a second instruction, from the first core to a third core of the multi-core processor. The second instruction may command the third core to execute the third procedure. The multi-core processor may further include a second core. The second core may be effective to receive the first instruction. The multi-core processor may further include a third core configured to be in communication with the first core. The third core may be effective to receive the second instruction. The first core may be further effective to execute the first procedure on the first core during execution by the second core of the second procedure and execution by the third core of the third procedure.

In some examples, methods to execute a program are generally described. The program may include a first procedure and a second procedure. The methods may include assigning the program to a call stack in a memory of a multi-core processor. The methods may further include partitioning the call stack into a first region associated with a first core of the multi-core processor and a second region associated with a second core of the multi-core processor. The methods may further include allocating, by the first core, the first region of the call stack into a first stack frame related to the first procedure. The methods may further include executing the first procedure on the first core using the first stack frame. The methods may further include receiving a value of a stack pointer for a second stack frame allocated by the second core related to the second procedure. The methods may further include, while executing the first procedure, sending an instruction, from the first core to the second core. The instruction may command the second core to execute the second procedure using the second stack frame. The methods may further include writing parameters for the second procedure into a memory block in a cache of the first core based on the stack pointer. The memory block may be part of the second stack frame.

In some examples, methods to execute a program are generally described. The program may include a first procedure and a second procedure. The methods may further include executing the first procedure on the first core. The methods may further include detecting a request to execute the second procedure on a second core in the multi-core processor. The methods may further include, while executing the first procedure, sending an instruction, from the first core to the second core. The instruction may command the second core to execute the second procedure. The methods may further include sending parameters for the second procedure from the first core to the second core to facilitate execution of the second procedure on the second core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates an example computer program product that can be utilized to implement distributed procedure execution in multi-core processors;

FIG. 9 is a block diagram illustrating an example computing device that is arranged to implement distributed procedure execution in multi-core processors; all arranged according to at least some embodiments described herein.

DETAILED DESCRIPTION

Figure 1:
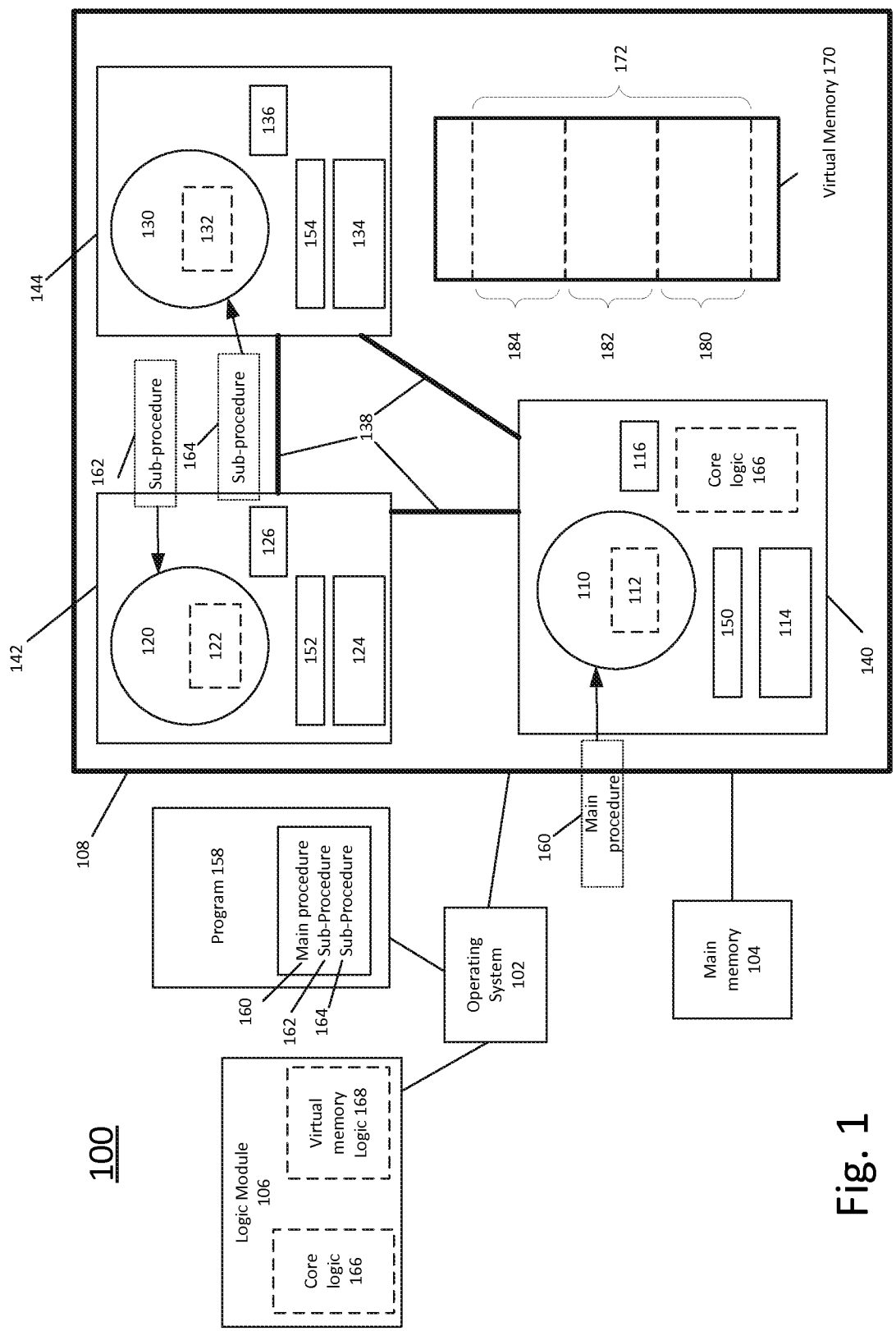
FIG. 1 illustrates an example system that can be utilized to implement distributed procedure execution in multi-core processors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to distributed procedure execution in multi-core processors.

Briefly stated, technologies are generally described for methods and systems effective to execute a program in a multi-core processor. In an example, methods to execute a program in a multi-core processor may include executing a first procedure on a first core of a multi-core processor. The methods may further include while executing the first procedure, sending a first and second instruction, from the first core to a second and third core, respectively. The instructions may command the cores to execute second and third procedures. The methods may further include executing the first procedure on the first core while executing the second procedure on the second core and executing the third procedure on the third core.

FIG. 1 illustrates an example system that can be utilized to implement distributed procedure execution in multi-core processors arranged in accordance with at least some embodiments described herein. An example system 100 may include a multi-core processor 108 (sometimes "processor" herein) and/or a main memory 104. Main memory 104 may be configured to store data relating to system 100 and may be located inside or outside of processor 108. Processor 108 may include two or more tiles 140, 142, 144 configured to be in communication with each other. Tile 140 may include a core 110, a memory 112, a memory 114, a register 116, core logic 166, and/or a cache controller 150. Tile 142 may include a core 120, a memory 122, a memory 124, a register 126, and/or a cache controller 152. Tile 144 may include a core 130, a memory 132, a memory 134, a register 136, and/or a cache controller 154. Core 110 may be configured in communication with cache controller 150. Core 120 may be configured in communication with cache controller 152. Core 130 may be configured in communication with cache controller 154.

Memory 112 may be inside core 110 and may be a L1 cache. Memory 122 may be inside core 120 and may be a L1 cache. Memories 114, 124 and/or 134 may be a L2 cache. Memory 132 may be inside core 130 and may be a L1 cache. Cores 110, 120 and/or 130 may be respectively configured in communication with registers 116, 126 and/or 136. Registers 116, 126 and/or 136 may be inside or outside of cores 110, 120 and/or 130, respectively. Registers 116, 126 and/or 136 may be configured to store one or more addresses. Cores 110, 120 and/or 130 may be configured in communication with each other through a bus 138.

Processor 108 may be configured to receive a program 158 from an operating system 102. Operating system 102 may communicate with a logic module 106. Logic module 106 may be implemented as software, hardware, or a combination of hardware and software. Operating system 102 may be configured to assign programs and/or procedures to one or more cores in processor 108. Logic module 106 may include core logic 166 and/or virtual memory logic 168.

Program 158 may include a main procedure 160, and two or more sub-procedures 162 and 164. Core 110 may be configured to receive instructions from operating system 102 relating to program 158 and/or main procedure 160. Core 110 may also be configured to execute program 158. Execution of program 158 may result in allocation of virtual memory 170. Virtual memory 170 may include a set of virtual addresses mapped to real addresses in main memory 104. Virtual memory 170 may be assigned by operating system 102 to facilitate execution of program 158. Virtual memory logic 168 may include algorithms effective to create and/or modify virtual memory 170.

Core 120 and/or 130 may be configured to receive instructions from operating system 102 relating to sub-procedures 162 and/or 164. In an example, main procedure 160 may be executed on core 110. In an example, core 110 may distribute sub-procedures 162 and/or 164 for execution on one or more cores 120 and/or 130. Core logic 166 may include algorithms effective to identify which cores should handle sub-procedures 162 and/or 164 such as using load balancing algorithms, selection based on availability of cores, etc. Core logic 166 may be in communication with operating system 102 and/or with core 110.

Operating system 102 may assign program 158 to a call stack 172 in virtual memory 170. Call stack 172 may be used to store information relating to execution of program 158. Call stack 172 may be partitioned, such as by operating system 102, into two or more regions 180, 182 and/or 184. In some examples, regions 180, 182, 184 may be contiguous to each other. In some examples, regions 180, 182, 184 may not be contiguous to each other. Regions 180, 182, 184 may be associated with respective cores by operating system 102 based on analysis of virtual memory logic 168. Region 180 of call stack 172 may be associated with core 110 by operating system 102. Region 182 of call stack 172 may be associated with core 120 by operating system 102. Region 184 of call stack 172 may be associated with core 130. One or more portions of call stack 172 may be stored in memory 112, 114 of core 110.

Each region of call stack 172 may be further allocated into respective stack frames to facilitate execution of main procedure 160 and sub-procedures 162, 164. The allocations may be performed by each core based on instructions from program 158. Region 180 may be allocated into a stack frame (discussed in more detail below) to facilitate execution of main procedure 160. Region 182 may be allocated into a stack frame (discussed in more detail below) to facilitate execution of sub-procedure 162. Region 184 may be allocated into a stack frame (discussed in more detail below) to facilitate execution of sub-procedure 164. As is discussed in more detail, each core 110, 120, 130 may use a respective region 180, 182, 184 in call stack 172 to execute a respective procedure. As a result of, at least in part, associating respective regions with cores, distributed procedure execution in multi-core processors may be realized.

Figure 2:
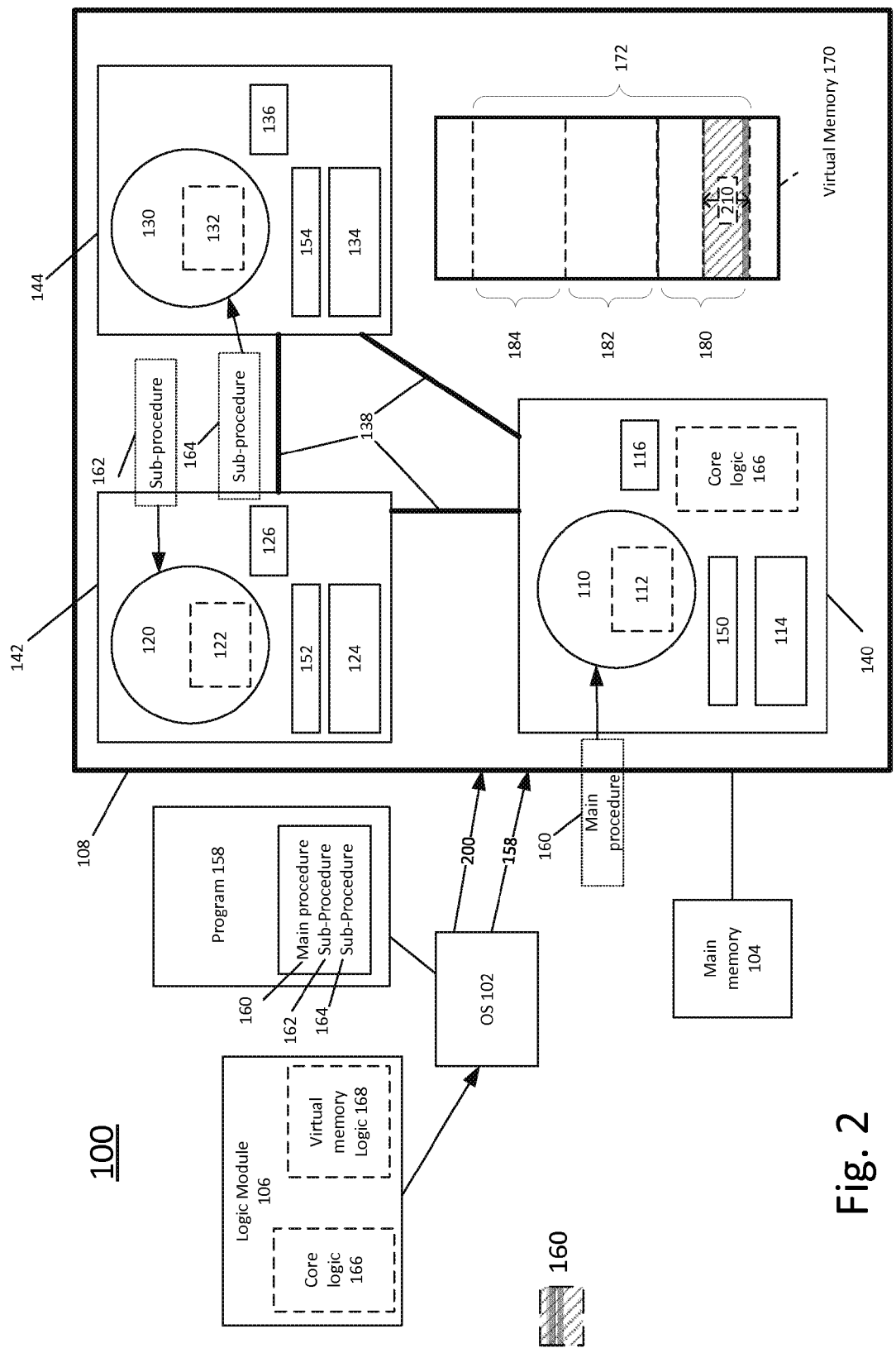
FIG. 2 illustrates the example system of FIG. 1 with additional detail relating to allocation of a stack frame.

FIG. 2 illustrates the example system of FIG. 1 with additional detail relating to allocation of a stack frame arranged in accordance with at least some embodiments described here. FIG. 2 is substantially similar to system 100 of FIG. 1, with additional details. Those components in FIG. 2 that are labeled identically to components of FIG. 1 will not be described again for the purposes of clarity and brevity.

In the depicted example, operating system 102 may request that processor 108 execute program 158. Operating system 102 may communicate with logic module 106 and generate an instruction 200. Instruction 200 may be effective to allocate virtual memory 170 in main memory 104. Instruction 200 may be further effective to assign call stack 172 to program 158 and partition call stack 172 into regions 180, 182 and/or 184. Instruction 200 may be effective to associate regions 180, 182 and/or 184 to cores 110, 120, and/or 130, respectively. Instruction 200 may further inform respective cores 110, 120, 130 of the respective associated regions 180, 182, 184 in call stack 172. Operating system 102 may send instruction 200 to processor 108.

Regions 180, 182 and/or 184 may each include a unique set of virtual addresses. Regions 180, 182 and/or 184 may be in a variety of size combinations. For example, regions 180, 182 and/or 184 may each include twenty virtual addresses. In another example, region 180 may include forty virtual addresses, region 182 may include twenty virtual addresses, and region 184 may also include twenty virtual addresses. The size of regions 180, 182 and/or 184 may remain the same until the completion of execution of program 158.

After respectively associating regions 180, 182 and 184 to cores 110, 120 and 130, operating system 102 may assign program 158 to processor 108. Operating system 102 and/or core logic 166 may identify which core, among cores in processor 108, may be used to execute main procedure 160. In an example, main procedure 160 may be executed by core 110. Operating system 102 may assign core 110 to execute main procedure 160.

Core 110 may receive program 158. Core 110 may allocate a portion of region 180 into a stack frame 210 to facilitate execution of main procedure 160. Stack frame 210 may include a subset of the virtual addresses within the set of virtual addresses assigned to region 180. For example, region 180 may range from virtual address 0 to virtual address 39 (total of 40 addresses) and stack frame 210 may range from virtual address 0 to virtual address 19 (total of 20 addresses). Stack frame 210 may be stored in memory 112 and/or memory 114. A size of stack frame 210 may be dependent on program 158 and/or main procedure 160. Data relating to execution of main procedure 160 may be stored in stack frame 210 as is illustrated by the shading of stack frame 210 in FIG. 2. As main procedure 160 executes, data in main memory 104, corresponding to data written to stack frame 210 in virtual memory 170, may be stored in memory 112 or 114. For example, as core 110 executes main procedure 160, data relating to the execution of main procedure 160 may be written to memory 112 and/or memory 114. A cache coherence protocol, such as may be implemented by cache controller 150, may propagate changes to data in memory 112, 114 to memory 122, 124 of core 120 and/or memory 132, 134 of core 130.

Figure 3:
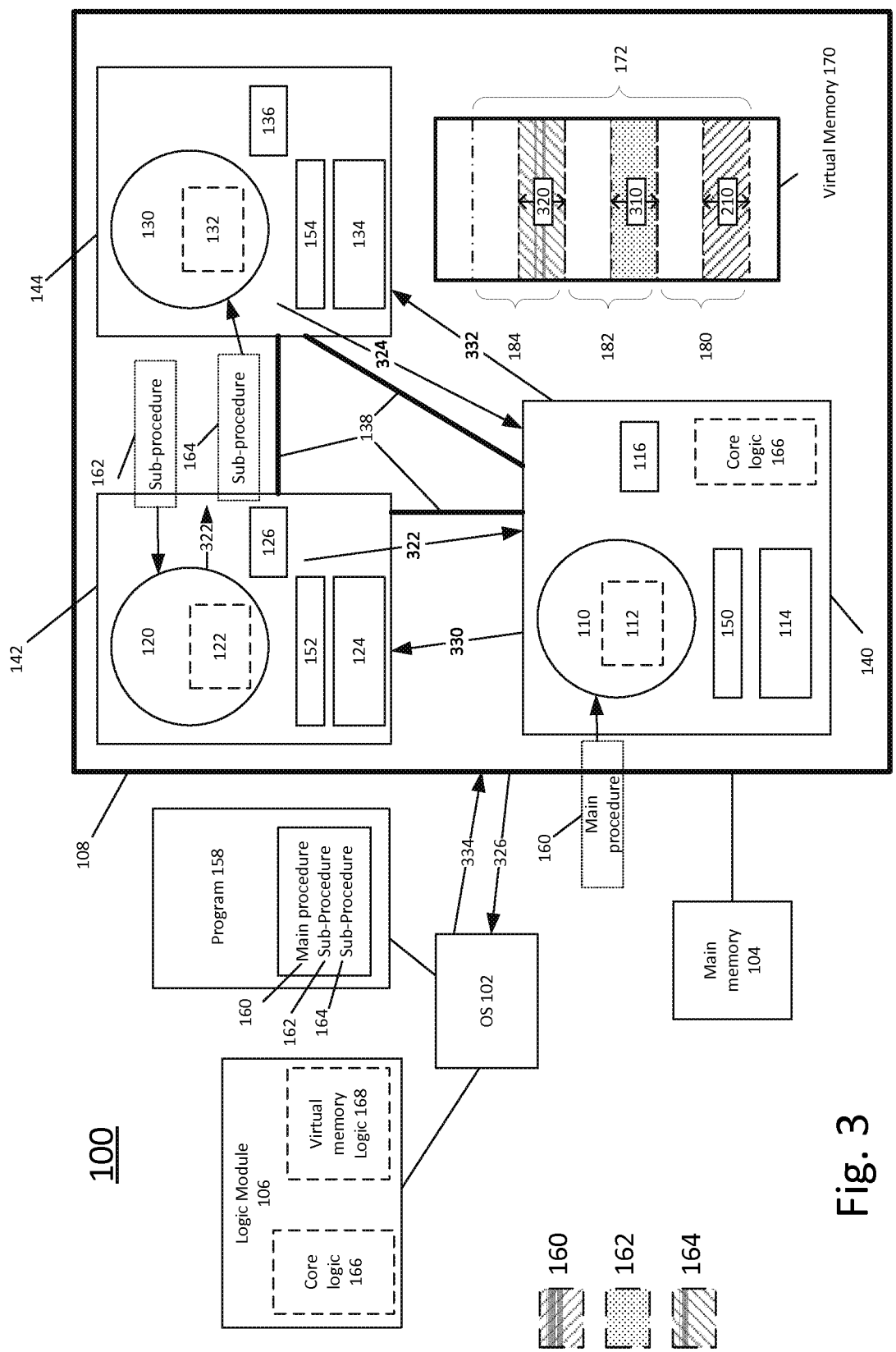
FIG. 3 illustrates the example system of FIG. 2 with additional detail relating to allocation of multiple stack frames.

FIG. 3 illustrates the example system of FIG. 2 with additional detail relating to allocation of multiple stack frames arranged in accordance with at least some embodiments described here. FIG. 3 is substantially similar to system 100 of FIG. 2, with additional details. Those components in FIG. 3 that are labeled identically to components of FIG. 2 will not be described again for the purposes of clarity and brevity.

In the example shown in FIG. 3, during execution of main procedure 160 by core 110, main procedure 160 may call, and/or detect a request to execute, sub-procedure 162. Core 110 may communicate with core logic 166 to identify a core to execute sub-procedure 162. Core logic 166 may identify which core, among cores in processor 108, may be used to execute sub-procedure 162. In an example, sub-procedure 162 may be executed by core 120. Core 110 may send instruction 330 to core 120 to execute sub-procedure 162 while core 110 executes main procedure 160. Instruction 330 may include a command for core 120 to execute sub-procedure 162.

In response to instruction 330, core 120 may allocate a portion of region 182 into a stack frame 310 to facilitate execution of sub-procedure 162. Stack frame 310 may include a subset of the virtual addresses within the set of virtual addresses assigned to region 182. Stack frame 310 may be stored main memory 104, in memory 122, and/or memory 124. A size of stack frame 310 may be dependent on sub-procedure 162. Data relating to execution of sub-procedure 162 may be stored in stack frame 310 as is illustrated by the shading in FIG. 3. As sub-procedure 162 executes, data relating to the execution of sub-procedure 162 may be written to memory 122 and/or memory 124. A cache coherence protocol, such as may be implemented by cache controller 152, may propagate changes to data in memory 122, 124 to core 110 and/or core 130.

During execution of main procedure 160 and sub-procedure 162, program 158 may call and/or detect a request to execute sub-procedure 164. Core 110 may communicate with core logic 166 to identify a core to execute sub-procedure 164. Core logic 166 may identify which core, among cores in processor 108, may be used to execute sub-procedure 164. In an example, sub-procedure 164 may be executed by core 130. Core 110 may send instruction 332 to core 130 to execute sub-procedure 164 while core 110 executes main procedure 160. Instruction 332 may include a command for core 130 to execute sub-procedure 164.

In response to instruction 332, core 130 may allocate a portion of region 184 into a stack frame 320 to facilitate execution of sub-procedure 164. Stack frame 320 may include a subset of the virtual addresses within the set of virtual addresses assigned to region 184. Stack frame 320 may be stored in memory 132 and/or memory 134. A size of stack frame 320 may be dependent on sub-procedure 164. Data relating to execution of sub-procedure 164 may be stored in stack frame 320 as is illustrated by the shading in FIG. 3. As sub-procedure 164 executes, data relating to execution of sub-procedure 164 may be written to memory 132 and/or memory 134. A cache coherence protocol, such as may be implemented by cache controller 154 may propagate changes to data in memory 132, 134 to core 110 and/or core 120.

Core 120 may generate result 322 in response to completion of sub-procedure 162. Core 120 may store result 322 in a location in stack frame 310. Core 110 may retrieve result 322 from stack frame 310 and store result 322 in a location of stack frame 210, memory 114 or in registers 116. In an example, core 110 may request a read of a location in stack frame 310 that corresponds to where result 322 should be stored. Cache controller 152 may implement a cache coherence protocol to propagate result 322 to memory 112 and/or memory 114 of core 110 in response to the request by core 110. Core 110 may receive result 322 in memory 112 and/or memory 114 to facilitate execution of main procedure 160. In some examples, core 110 may continue to execute main procedure 160 using result 322 without storing result 322 in memory 112, 114. Instruction 330 may further include instructions to command core 120 to de-allocate stack frame 310 in region 182 in response to core 110 receiving result 211.

Core 130 may generate result 324 in response to completion of sub-procedure 164. Core 130 may store result 324 in a location in stack frame 320. Core 110 may retrieve result 324 from stack frame 320 and store result 324 in a location in stack frame 310. In an example, core 110 may request a read of a location in stack frame 320 that corresponds to where result 324 should be stored. Cache controller 154 may implement a cache coherence protocol to propagate result 324 among cores 110, 120 in response to the request by core 110. Core 110 may receive result 324 and may store result 324 in memory 112 and/or 114 to facilitate execution of main procedure 160. Instruction 332 may further include instructions to de-allocate stack frame 320 in region 184. Core 130 may de-allocate stack frame 320 in region 184 in response to core 110 receiving result 324.

During execution of main procedure 160, core 110 may receive result 322 and result 324. Core 110 may complete main procedure 160 and may generate result 326. Result 326 may include data relating to result 322 and/or result 324. Core 110 may send result 326 to operating system 102. Operating system 102 may receive result 326 and send an instruction 334 to core 110. Instruction 334 may include instructions to de-allocate stack frame 210 in region 180 and/or call stack 172. Core 110 may de-allocate stack frame 210 in region 180 in response to receiving instruction 334. Operating system 102 may de-allocate virtual memory 170 upon completion of execution of program 158.

Figure 4:
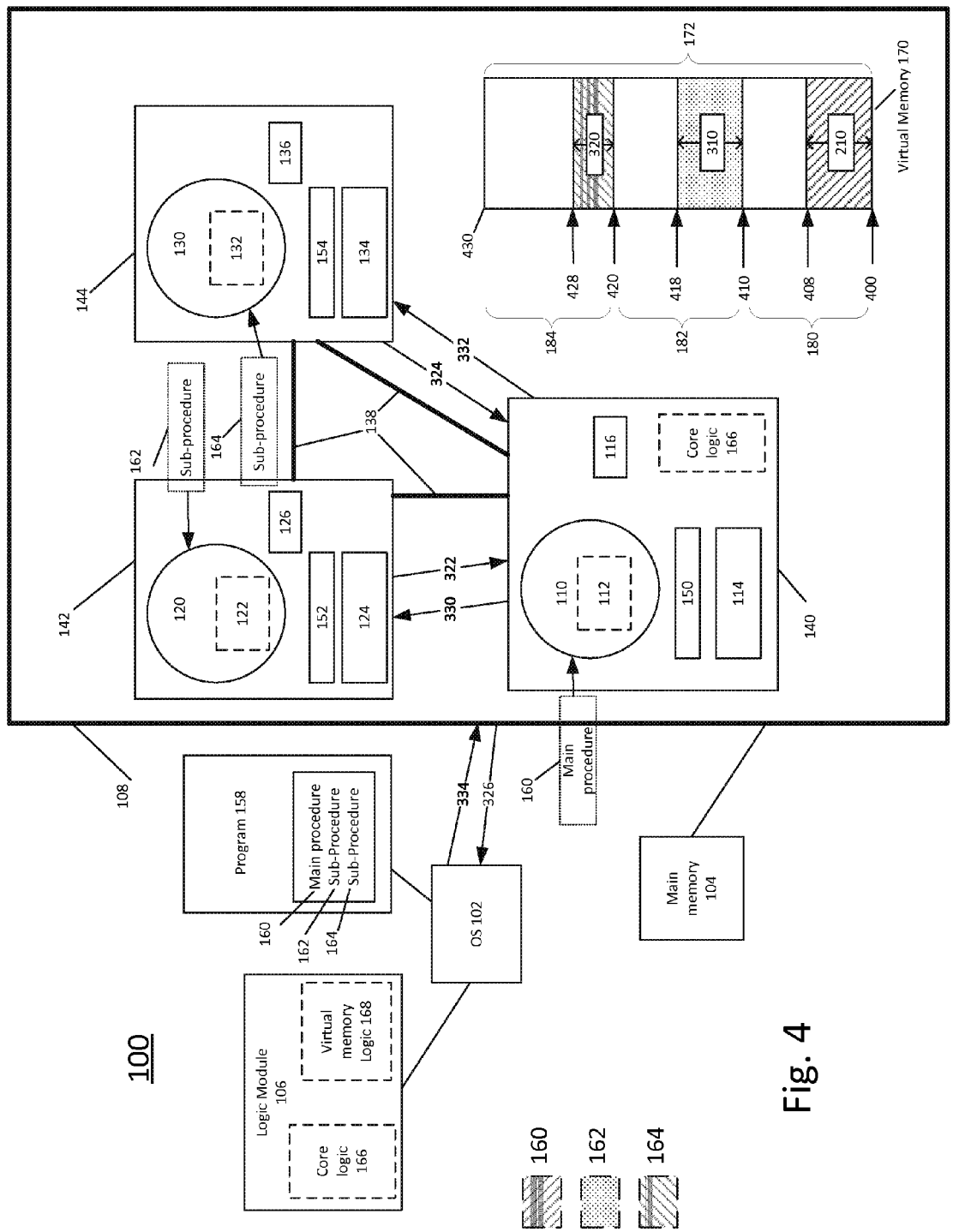
FIG. 4 illustrates the example system of FIG. 3 illustrating more detail relating to a call stack.

FIG. 4 illustrates the example system of FIG. 3 illustrating more detail relating to a call stack arranged in accordance with at least some embodiments described herein. FIG. 4 is substantially similar to system 100 of FIG. 3, with additional details. Those components in FIG. 4 that are labeled identically to components of FIG. 3 will not be described again for the purposes of clarity and brevity.

Operating system 102 may assign virtual memory 170 to facilitate execution of program 158. Virtual memory 170 may include call stack 172. Call stack 172 may be partitioned, such as by operating system 102 or program 158, into regions 180, 182 and 184. As shown in FIG. 4, region 180 may include a unique set of virtual addresses ranging from a base pointer 400 to a base pointer 410. Region 182 may include a unique set of virtual addresses ranging from base pointer 410 to a base pointer 420. Region 184 may include a unique set of virtual addresses ranging from base pointer 420 to an end 430 of call stack 172. Base pointers 400, 410, 420 may be respectively stored in registers 116, 126, 136.

Base pointers 400, 410 and/or 420 may be virtual addresses within the set of virtual addresses of call stack 172. Base pointers 400, 410 and/or 420 may be effective to define a start of regions 180, 182, and/or 184. For example, base pointer 400 may be virtual address 0 and base pointer 410 may be virtual address 40. Region 180 may include virtual addresses ranging from virtual address 0 to virtual address 39 (total 40 addresses). Base pointer 420 may be virtual address 80. Region 182 may include virtual addresses ranging from virtual address 40 to virtual address 79 (total 40 addresses). An end 430 of call stack 172 may be virtual address 120. Region 184 may include virtual addresses ranging from virtual address 80 to virtual address 119 (total 40 addresses). Virtual addresses of regions 180, 182, 184 may not be contiguous to each other.

In the example, core 110 may allocate at least some of region 180 into stack frame 210 to facilitate execution of main procedure 160. For example, core 110 may invalidate a region in cache 112, 114 corresponding to stack frame 210. A stack pointer 408, as shown in FIG. 4, may be a virtual address effective to define the size and/or location of stack frame 210 within region 180. Core 110 may assign, such as by executing instructions in program 158, a value to stack pointer 408 that corresponds to a size of stack frame 210. For example, stack pointer 408 may be the virtual address 20. In the example, stack frame 210 may include virtual addresses ranging from virtual address 0 to virtual address 19 (total 20 addresses).

Core 110 may store the value of stack pointer 408 in register 116. Core 110 may analyze stack pointer 408 and may write parameters relating to main procedure 160 to virtual addresses in stack frame 210 with reference to stack pointer 408. Stack pointer 408 may remain stored in register 116 until core 110 completes main procedure 160. Register 116 may include two or more special purpose and/or general purpose registers.

Continuing with the example, core 120 may allocate at least some of region 182 into stack frame 310 to facilitate execution of sub-procedure 162. For example, core 120 may invalidate a region in cache 122, 124 corresponding to stack frame 310. A stack pointer 418, as shown in FIG. 4, may be a virtual address effective to define the size and/or location of stack frame 310 within region 182. For example, stack pointer 418 may be the virtual address 60. Stack frame 310 may include virtual addresses ranging from virtual address 40 to virtual address 59 (total 20 addresses). Core 120 may store stack pointer 418 in register 126. In response to instruction 330, core 120 may send the value of stack pointer 418 to core 110. In an example, core 120 may send the value of stack pointer 418 to core 110 through bus 138. Core 110 may store stack pointer 418 in register 116, memory 112 or memory 114.

Core 110 may analyze stack pointer 418 and may write parameters relating to sub-procedure 162 to virtual addresses in stack frame 310 with reference to stack pointer 418. Stack frame 310 may be stored in register 116, memory 112, or memory 114. Parameters relating to sub-procedure 162 may be stored in memory blocks in memory 114 or memory 112 based on stack pointer 418. Stack pointer 418 may remain stored in register 116 until core 120 completes sub-procedure 162 and/or until core 110 receives result 322. Core 120 may access parameters relating to sub-procedure 162 by issuing read requests to pertinent locations in stack frame 310. A cache coherence protocol may be used to ensure the parameters written by core 110 may be read by core 120.

In an example, execution of main procedure 160 may reach an execution point where result 322 is required. At the execution point, core 110 may issue a read request to read from a location in stack frame 310 where result 322 should be stored. If core 120 has completed sub-procedure 162, core 110 may access result 322. If core 120 has yet to complete sub-procedure 162, a cache coherence protocol may not respond to requests by core 110 to access result 322 until core 120 completes sub-procedure 162. Core 110 may resume main procedure 160 in response to receiving result 322. In some examples, core 110 may resend instruction 330 to core 120 to de-allocate stack frame 310. After core 120 de-allocates stack frame 310, a value of stack pointer 418 may be equivalent to base pointer 410.

Continuing with the example, core 130 may allocate at least some of region 184 into stack frame 320 to facilitate execution of sub-procedure 164. For example, core 130 may invalidate a region in cache 132, 134 corresponding to stack frame 320. A stack pointer 428, as shown in FIG. 4, may be a virtual address effective to define the size and/or location of stack frame 320 within region 184. For example, stack pointer 428 may be the virtual address 100. Stack frame 320 may include virtual addresses ranging from virtual address 80 to virtual address 99 (total 20 addresses). Core 130 may store stack pointer 428 in register 136. In response to instruction 332, core 130 may send the value of stack pointer 428 to core 110. In an example, core 130 may send the value of stack pointer 428 to core 110 through bus 138. Core 110 may store stack pointer 428 in memory 112 or memory 114.

Core 110 may analyze stack pointer 428 and may write parameters relating to sub-procedure 164 to virtual addresses in stack frame 320 with reference to stack pointer 428. After core 110 writes parameters relating to sub-procedure 164 to stack frame 320, core 110 may store stack pointer 428 in register 116. Stack pointer 428 may remain stored in register 116 until core 130 completes sub-procedure 164.

In an example, execution of main procedure 160 may reach an execution point where result 324 is required. At the execution point, core 110 may issue a read request to read from a location in stack frame 320 where result 324 should be stored. If core 130 has completed sub-procedure 164, core 110 may access result 324. If core 130 has yet to complete sub-procedure 164, core 110 may interrupt main procedure 160. Core 110 may resume main procedure 160 in response to receiving result 324. After core 110 can read result 324, core 110 may also send instruction 332 to de-allocate stack frame 320. After core 130 de-allocates stack frame 320, stack pointer 428 may have the same value as base pointer 420.

Figure 5:
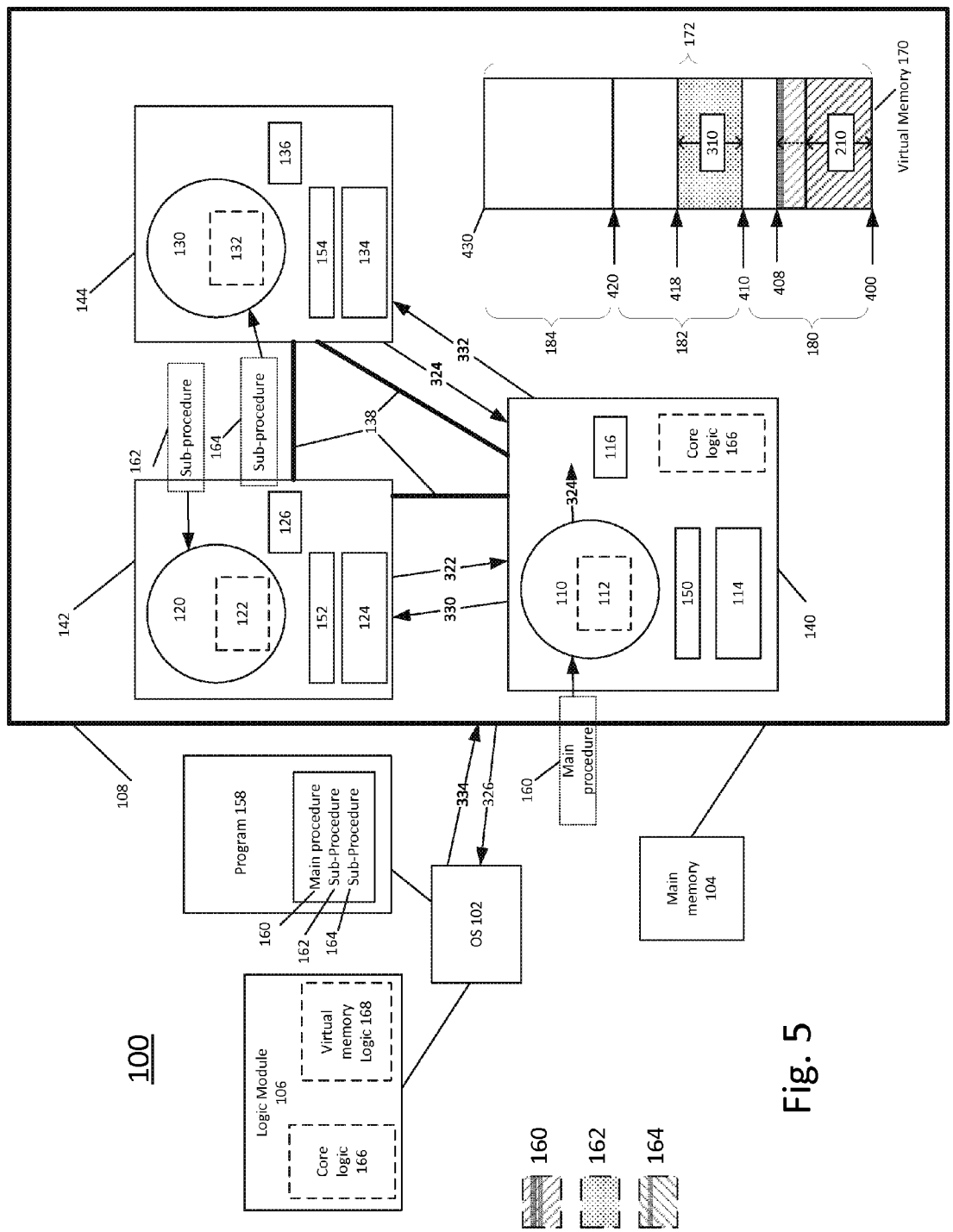
FIG. 5 illustrates an example use of the system of FIG. 4.

FIG. 5 illustrates an example use of the system of FIG. 4 illustrating an example arranged in accordance with at least some embodiments described herein. FIG. 5 is substantially similar to system 100 of FIGS. 3 and 4, with additional details. Those components in FIG. 5 that are labeled identically to components of FIGS. 3 and 4 will not be described again for the purposes of clarity and brevity.

In an example, during execution of main procedure 160 and sub-procedure 162, sub-procedure 164 may be called by program 158. Operating system 102 and/or core logic 166 may detect that core 130 is not available to execute sub-procedure 164.

Core 110 may interrupt execution of main procedure 160 to facilitate execution of sub-procedure 164. Core 110 may reallocate stack frame 210 by changing the value of stack pointer 408 to facilitate execution of sub-procedure 164. For example, stack pointer 408 may previously be the virtual address 20. In response to the need to execute sub-procedure 164, the value of stack pointer 408 may be changed to the virtual address 30. Stack frame 210 may range from the virtual address 0 to virtual address 29 (total 30 addresses). Virtual address 0 to virtual address 19 (total 20 addresses) may be reserved for main procedure 160. Core 110 may use virtual addresses 20 to 29 (total 10 addresses) to execute sub-procedure 164. Core 110 may store the value of stack pointer 408 in memory 112 or memory 114.

After core 110 stores stack pointer 408 in memory 112 or memory 114, core 110 may analyze stack pointer 408 and may write parameters relating to sub-procedure 164 to stack frame 210. After core 110 writes parameters relating to sub-procedure 164 to stack frame 210, core 110 may store stack pointer 408 in register 116. Stack pointer 408 may remain stored in register 116 until core 110 completes the execution of sub-procedure 164.

Core 110 may complete the execution of sub-procedure 164 and generate result 324. Core 110 may store result 324 in a virtual address within the set of virtual addresses reserved for main procedure 160. Core 110 may reallocate stack frame 210 to range from virtual address 0 to virtual address 19. Core 110 may change the value of stack pointer 408 and replace the previous value of stack pointer 408 in register 116. Core 110 may resume execution of main procedure 160.

Figure 6:
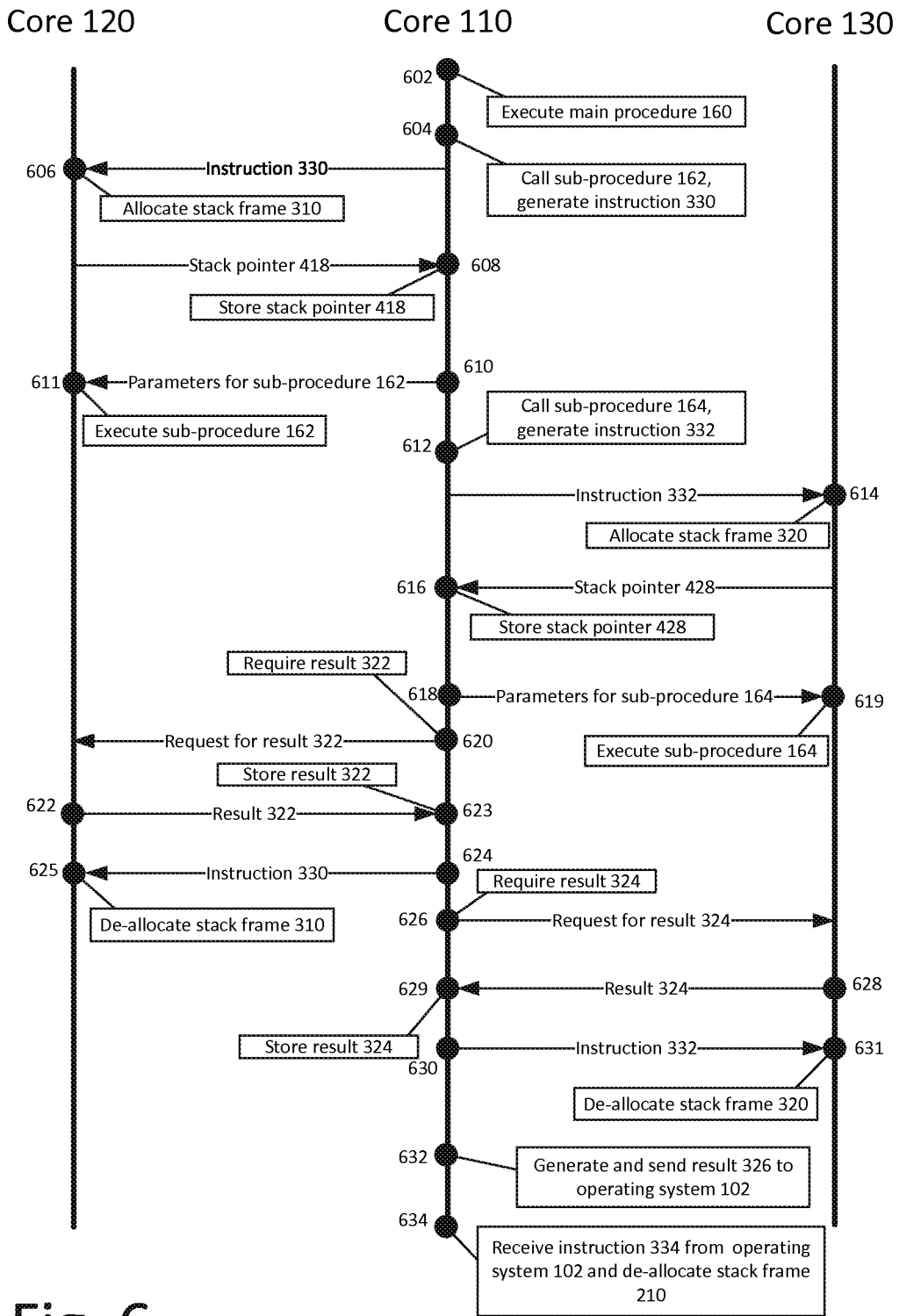
FIG. 6 depicts a signal flow graph for an example process to implement distributed procedure execution in multi-core processors.

FIG. 6 depicts a signal flow graph for an example process to implement distributed procedure execution in multi-core processors accordance with at least some embodiments described herein. An example process 600 may start from operation 602. At operation 602, core 110 may begin execution of main procedure 160.

Processing may continue from operation 602 to operation 604. At operation 604, while core 110 is executing main procedure 160, main procedure 160 may call sub-procedure 162. Core 110 may identify core 120, such as by using instructions in core logic 166, to execute sub-procedure 162. Core 110 may generate and send instruction 330. Instruction 330 may include instructions to command core 120 to execute sub-procedure 162.

Processing may continue from operation 604 to operation 606. At operation 606, core 120 may receive instruction 330 from core 110. Core 120 may allocate stack frame 310 in response to receiving instruction 330. After allocation of stack frame 310, core 120 may generate stack pointer 418.

Processing may continue from operation 606 to 608. At operation 608, Core 110 may receive stack pointer 418 from core 120. Core 110 may store stack pointer 418 in memory 112 or memory 114.

Processing may continue from operation 608 to 610. At operation 610, core 110 may write parameters relating to sub-procedure 162 to virtual addresses in stack frame 310 with reference to stack pointer 418. Processing may continue from operation 610 to 611. At operation 611, core 120 may receive parameters relating to sub-procedure 162 from core 110. Core 120 may begin execution of sub-procedure 162 using the parameters relating to sub-procedure 162.

Processing may continue from operation 611 to operation 612. At operation 612, while core 110 is executing main procedure 160 and core 120 is executing sub-procedure 162, main procedure 160 may call sub-procedure 164. Core 110 may identify core 130 to execute sub-procedure 164. Core 110 may generate and send instruction 332. Instruction 332 may include instructions to command core 130 to execute sub-procedure 164.

Processing may continue from operation 612 to operation 614. At operation 614, core 130 may receive instruction 332 from core 110. Core 130 may allocate stack frame 320 in response to receiving instruction 332. After allocation of stack frame 320, core 130 may generate stack pointer 428.

Processing may continue from operation 614 to 616. At operation 614, Core 110 may receive stack pointer 428 from core 130. Core 110 may store stack pointer 428 in memory 112 or memory 114.

Processing may continue from operation 616 to 618. At operation 618, core 110 may write parameters relating to sub-procedure 164 to virtual addresses in stack frame 320 with reference to stack pointer 428. Processing may continue from operation 618 to 619. At operation 619, core 130 may receive parameters relating to sub-procedure 164 from core 110. Core 130 may begin execution of sub-procedure 164 using the parameters relating to sub-procedure 164.

Processing may continue from operation 619 to 620. At operation 620, core 110 may require result 322 from sub-procedure 162 for further execution of main procedure 160. In some examples, core 110 may require result 322 before result 324. Core 110 may send a request to core 120 for result 322. In some examples, core 110 may continue to execute main procedure 160 when result 322 is not required for further execution of main procedure 160. In some examples, core 110 may interrupt execution of main procedure 160 until core 110 receives result 322 from core 120 when result 322 is required for further execution of main procedure 160.

Processing may continue from operation 620 to 622. At operation 622, core 120 may complete execution of sub-procedure 162 and generate result 322. Core 120 may send result 322 to core 110. Processing may continue from operation 622 to 623. At operation 623, core 110 may receive result 322 from core 120 and store result 322 in memory 112 or memory 114. Core 110 may resume execution of main procedure 160 in response to receiving result 322.

Processing may continue from operation 623 to 624. At operation 624, core 110 may send another instruction 330 to core 120 in response to receiving result 322. Instruction 330 may include instructions to command core 120 to de-allocate stack frame 310. Processing may continue from operation 624 to 625. At operation 625, core 120 may de-allocate stack frame 310 in response to receiving instruction 330.

Processing may continue from operation 624 to 626. At operation 626, core 110 may require result 324 from sub-procedure 164 for further execution of main procedure 160. Core 110 may send a request to core 130 for result 324. In some examples, core 110 may interrupt execution of main procedure 160 until core 110 receives result 324 from core 130.

Processing may continue from operation 626 to 628. At operation 628, core 130 may complete execution of sub-procedure 164 and generate result 324. Core 130 may send result 324 to core 110. Processing may continue from operation 628 to 629. At operation 629, core 110 may receive result 324 from core 130 and store result 324 in memory 112 or memory 114. Core 110 may resume execution of main procedure 160 in response to receiving result 324.

Processing may continue from operation 629 to 630. At operation 630, core 110 may send another instruction 332 to core 130 in response to receiving result 324. Instruction 332 may include instructions to command core 120 to de-allocate stack frame 310. Processing may continue from operation 630 to 631. At operation 631, core 130 may de-allocate stack frame 320 in response to receiving instruction 332.

Processing may continue from operation 631 to 632, at operation 632, core 110 may complete execution of main procedure 160 and generate result 326. Result 326 may include result 322 and/or result 324. Core 110 may send result 326 to operating system 102.

Processing may continue from operation 632 to 634. At operation 634, Core 110 may receive an instruction 334 from operating system 102. Instruction 334 may include instructions to de-allocate stack frame 210. Core 110 may de-allocate stack frame 210 in response to receiving instruction 334.

Figure 7:
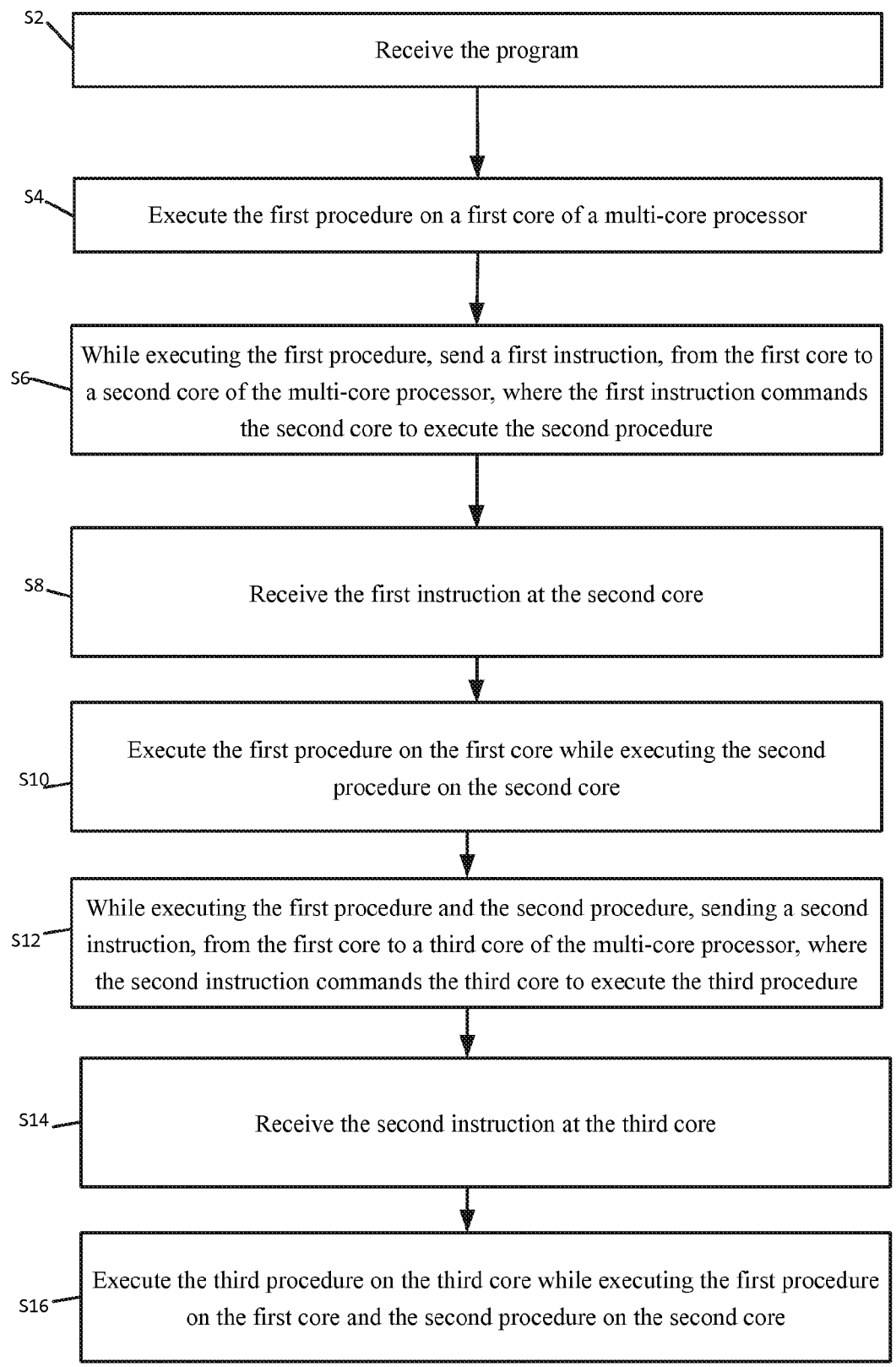
FIG. 7 illustrates a flow diagram for an example process to implement distributed procedure execution in multi-core processors.

FIG. 7 illustrates a flow diagram for an example process to implement distributed procedure execution in multi-core processors arranged in accordance with at least some embodiments presented herein. The process in FIG. 7 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, supplemented with additional blocks representing other operations, actions, or functions, or eliminated, depending on the particular implementation.

Processing may begin at block S2 "Receive the program." At block S2, a program including a first procedure and a second procedure may be received by a multi-core processor.

The program may be assigned to a call stack in a memory of the multi-core processor. The call stack may be partitioned into a first region associated with the first core and a second region associated with the second core. The first core may allocate the first region into a first stack frame. The second core may allocate the second region into a second stack frame. The second stack frame may have a size that remains substantially the same during execution of the first procedure.

Processing may continue from block S2 to S4. At block S4, "Execute the first procedure on a first core of a multi-core processor." The first procedure of the program may be executed on a first core of the multi-core processor.

Processing may continue from block S4 to S6. At block S6, "While executing the first procedure, send a first instruction, from the first core to a second core of the multi-core processor, where the first instruction commands the second core to execute the second procedure." During execution of the first procedure, the second procedure may be called by the first procedure. The first core may send an instruction to a second core in the multi-core processor to command the second core to execute the second procedure.

Prior to sending the instruction, the second core may assign a value to a stack pointer for the second stack frame. The second core may send the value of the stack pointer to the first core. The first core may receive the value of the stack pointer. The first core may store the value of the stack pointer in a register of the first core. The first core may write parameters for the second procedure into a memory block in a cache of the first core based on the stack pointer, where the memory block may be part of the second stack frame. The first core may propagate the parameters from the cache of the first core to the second core by implementing a cache coherence protocol.

Processing may continue from block S6 to S8. At block S8, "Receive the first instruction at the second core." The second core may receive the instruction from the first core.

Processing may continue from block S8 to S10. At block S10, "Execute the first procedure on the first core while executing the second procedure on the second core." The first core may continue to execute the first procedure while the second core executes the second procedure. Execution of the first and second procedure may be performed simultaneously.

Processing may continue from block S10 to S12. At block S12, "While executing the first procedure and the second procedure, sending a second instruction, from the first core to a third core of the multi-core processor, where the second instruction commands the third core to execute the third procedure." At block S12, the first core may send a second instruction to a third core while executing the first and second procedure. The second instruction may command a third core to execute a third procedure.

Processing may continue from block S12 to S14. At block S14, "Receive the second instruction at the third core." At block S14, the second instruction may be received at the third core.

Processing may continue from block S14 to S16. At block S16, "Execute the third procedure on the third core while executing the first procedure on the first core and the second procedure on the second core." At block S16, the third procedure may be executed on the third core while the first procedure is executed on the first core and the second procedure is executed on the second core.

Prior the execution of the second procedure, the second core may invalidate memory blocks in the second stack frame. The second core may write a result to the second procedure into a memory block in a cache of the second core. The memory block may be part of the second stack frame. The second core may propagate the result to the first core by implementing a cache coherence protocol.

FIG. 8 illustrates an example computer program product 800 that can be utilized to implement distributed procedure execution in multi-core processors arranged in accordance with at least some embodiments described herein. Computer program product 800 may include a signal bearing medium 802. Signal bearing medium 802 may include one or more instructions 804 that, in response to execution by, for example, a processor, may provide the features described above with respect to FIGS. 1-7. Thus, for example, referring to system 100, multi-core processor 108 may undertake the operations depicted in one or more of the blocks shown in FIG. 7 in response to instructions 804 conveyed to the system 100 by signal bearing medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, computer program product 800 may be conveyed to one or more modules of the system 100 by an RF signal bearing medium 802, where the signal bearing medium 802 is conveyed by a wireless communications medium 810 (e.g., a wireless communications medium conforming with the IEEE 802.11 standard).

FIG. 9 is a block diagram illustrating an example computing device 900 that is arranged to implement distributed procedure execution in multi-core processors arranged in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor ($\mu$P), a microcontroller ($\mu$C), a digital signal processor (DSP), or any combination thereof. Processor 904 (which may be the previously described processor 108) may include one more levels of caching, such as a level one cache 910 and a level two cache 912, processor core(s) 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 (which may be the previously described main memory 104) may include an operating system 920 (which could be the previously described operating system 102), one or more applications 922, and program data 924. Application 922 may include a distributed procedure execution algorithm 926 that is arranged to perform the operations as described herein including those described with respect to system 100 of FIGS. 1-7. Program data 924 may include distributed procedure execution data 928 that may be useful to implement distributed procedure execution in multi-core processor as is described herein. In some embodiments, application 922 may be arranged to operate with program data 924 on operating system 920 such that distributed procedure execution in multi-core processor may be provided. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to execute a program, wherein the program includes a first procedure and a second procedure, the method comprising:
   identifying a virtual call stack assigned to the program, wherein the virtual call stack is in a virtual memory of a multi-core processor, and the multi-core processor includes at least a first core and a second core;
   identifying a first region and a second region that are partitioned from the virtual call stack, wherein the first region is associated with the first core and the second region is associated with the second core;
   executing the first procedure on the first core using the first region of the virtual call stack;
   while executing the first procedure, executing, by the first core in response to a call for the second procedure by the first procedure, a core logic instruction to identify the second core;
   while executing the first procedure, sending, by the first core in response to the identification of the second core, an instruction to the second core of the multi-core processor, wherein the instruction commands the second core to execute the second procedure; and
   receiving the instruction at the second core;
   assigning a value to a stack pointer, wherein the stack pointer is associated with a stack frame related to the second procedure, and the stack frame is allocated from the second region of the virtual call stack;
   sending the value of the stack pointer from the second core to the first core;
   receiving the value of the stack pointer at the first core;
   writing parameters for the second procedure into a cache of the first core based on the value of the stack pointer;
   implementing a cache coherence protocol to propagate the parameters from the cache of the first core to a cache of the second core; and
   executing the second procedure on the second core using the second region of the virtual call stack while executing the first procedure on the first core.

2. The method of claim 1, wherein the instruction is a first instruction, the method further comprising:
   while executing the first procedure and the second procedure, sending, by the second core, a second instruction to a third core of the multi-core processor, wherein the second instruction commands the third core to execute a third procedure of the program;
   receiving the second instruction at the third core; and
   executing the third procedure on the third core using a third region of the virtual call stack while executing the first procedure on the first core and the second procedure on the second core, wherein the third region is partitioned from the virtual call stack, and wherein the third region is associated with the third core.

3. The method of claim 1, wherein:
   the stack frame is a first stack frame;
   the virtual call stack is assigned to the program prior to executing the first procedure on the first core; and
   the virtual call stack is partitioned into the first region and the second region prior to executing the first procedure on the first core, and the method further comprises:
      prior to executing the first procedure on the first core, allocating, by the first core, a portion of the first region of the virtual call stack into a second stack frame related to the first procedure; and
      prior to executing the second procedure on the second core, allocating, by the second core, a portion of the second region of the virtual call stack into the first stack frame related to the second procedure.

4. The method of claim 3, wherein the first and second regions have respective sizes that remain substantially the same during execution of the first procedure.

5. The method of claim 3, wherein:
   prior to executing the second procedure, allocating the portion of the second region of the virtual call stack into the first stack frame by invalidating memory blocks in the cache of the second core, wherein the invalidated memory blocks in the cache of the second core correspond to the first stack frame.

6. The method of claim 3, further comprising:
   writing, by the second core, a first result from execution of the second procedure into the cache of the second core; and
   implementing the cache coherence protocol to propagate the first result from the cache of the second core to the cache of the first core.

7. The method of claim 1, further comprising storing the value of the stack pointer in a register of the first core.

8. A multi-core processor effective to execute a program, wherein the program includes a first procedure and a second procedure, the multi-core processor comprising:
   a first core and a second core, the first core effective to:
      execute the first procedure, wherein prior to the execution of the first procedure, the program is assigned to a virtual call stack in a virtual memory of the multi-core processor, and the virtual call stack is partitioned into a first region associated with the first core and a second region associated with the second core; and
      during execution of the first procedure:
         in response to a call for the second procedure by the first procedure, execute a core logic instruction to identify the second core;

in response to identification of the second core, send an instruction, from the first core to a second core of the multi-core processor, wherein the instruction commands the second core to execute the second procedure;

the second core configured to be in communication with the first core, the second core effective to:

receive the instruction;

assign a value to a stack pointer, wherein the stack pointer is associated with a stack frame related to the second procedure, and the stack frame is allocated from the second region of the virtual call stack;

send the value of the stack pointer to the first core;

the first core is further effective to:

receive the value of the stack pointer;

write parameters for the second procedure into a cache of the first core based on the value of the stack pointer;

implement a cache coherence protocol to propagate the parameters from the cache of the first core to a cache of the second core; and execute the first procedure during execution by the second core of the second procedure.

9. The multi-core processor of claim 8, further comprising a third core configured to be in communication with the first core and the second core;

and wherein:

the instruction is a first instruction;

the program includes a third procedure;

the second core is further effective to send a second instruction to the third core of the multi-core processor, wherein the second instruction commands the third core to execute the third procedure;

the third core is effective receive the second instruction; and the third core is effective to execute the third procedure on the third core during execution of the first procedure by the first core and during execution of the second procedure by the second core.

10. The multi-core processor of claim 8, wherein:

the stack frame is a first stack frame;

prior to the execution of the first procedure, the first core is further effective to allocate the first region of the virtual call stack into a second stack frame related to the first procedure; and prior to the execution of the second procedure, the second core is further effective to allocate the second region of the virtual call stack into the first stack frame related to the second procedure.

11. The multi-core processor of claim 10, wherein:

the second core is effective to, prior to execution of the second procedure, invalidate memory blocks in the cache of the second core to allocate the portion of the second region of the virtual call stack into the first stack frame, wherein the invalidated memory blocks in the cache of the second core correspond to the first stack frame.

12. The multi-core processor of claim 10, wherein:

the second core is effective to:

write a first result to the second procedure into the cache of the second core; and implement the cache coherence protocol to propagate the first result from the cache of the second core to the cache of the first core.

13. The multi-core processor of claim 8, wherein the first core includes a register effective to store the value of the stack pointer.

14. A method to execute a program, wherein the program includes a first procedure and a second procedure, the method comprising:

identifying a virtual call stack assigned to the program, wherein the virtual call stack is assigned to the program prior to an execution of the first procedure, the virtual call stack is in a virtual memory of a multi-core processor, the virtual call stack is partitioned into a first region associated with a first core of the multi-core processor and into a second region associated with a second core of the multi-core processor, and wherein the virtual call stack is partitioned into the first region and the second region prior to the execution of the first procedure;

allocating, by the first core, a portion of the first region of the virtual call stack into a first stack frame related to the first procedure, wherein a first size of the first stack frame is based on the first procedure;

executing the first procedure on the first core using the first stack frame;

executing, by the first core in response to a call for the second procedure by the first procedure, a core logic instruction to identify the second core;

while executing the first procedure, sending, by the first core in response to the identification of the second core, an instruction to the second core, wherein the instruction commands the second core to execute the second procedure;

receiving, by the first core, a value of a stack pointer for a second stack frame related to the second procedure, wherein the second stack frame is allocated by the second core in response to the receipt of the instruction and prior to an execution of the second procedure, the stack pointer being assigned, by the second core, to the second stack frame prior to the execution of the second procedure, the second stack frame is a portion of the second region of the virtual call stack, and a second size of the second stack frame is based on the second procedure;

writing, by the first core, parameters for the second procedure into a memory block in a cache of the first core based on the stack pointer, wherein the memory block is part of the second stack frame; and implementing, by the first core, a cache coherence protocol to propagate the parameters from the cache of the first core to a cache of the second core.

15. The method of claim 14, further comprising, prior to executing the first procedure, invalidating memory blocks in the first stack frame.

16. The method of claim 14, further comprising storing the value of the stack pointer in a register of the first core.

17. A method to execute a program, wherein the program includes a first procedure and a second procedure, the method comprising:

identifying a virtual call stack assigned to the program, wherein the virtual call stack is in a virtual memory of a multi-core processor, and the multi-core processor includes at least a first core and a second core;

identifying a first region and a second region partitioned from the virtual call stack, wherein the first region is associated with the first core, and the second region is associated with the second core;

executing the first procedure on the first core;

while executing the first procedure, detecting, by the first core, a request to execute the second procedure on the second core in the multi-core processor;

executing, by the first core in response to the detection, a core logic instruction to identify the second core in the multi-core processor;

while executing the first procedure, sending, by the first core in response to the identification of the second core, an instruction to the second core, wherein the instruction commands the second core to execute the second procedure;

receiving, by the first core, a value of a stack pointer, wherein the stack pointer is associated with a stack frame related to the second procedure, and the stack frame is allocated from the second region of the virtual call stack;

writing, by the first core, parameters for the second procedure into a cache of the first core based on the value of the stack pointer; and implementing, by the first core, a cache coherence protocol to propagate the parameters from the cache of the first core to a cache of the second core to facilitate an execution of the second procedure on the second core.

18. The method of claim 17, wherein:

the stack frame is a first stack frame;

the virtual call stack is assigned to the program prior to receiving the program at the first core; and the virtual call stack is partitioned into the first region and the second region prior to receiving the program at the first core, and the method further comprises:

allocating, by the first core, to the first region of the virtual call stack a second stack frame related to the first procedure, wherein execution of the first procedure on the first core includes use of the second stack frame.

19. The method of claim 18, further comprising allocating the first stack frame by the second core in response to receiving the instruction, wherein execution of the second procedure on the second core includes use of the first stack frame.

20. The method of claim 17, further comprising writing the parameters for the second procedure into a memory block of the cache of the first core based on the stack pointer for the stack frame, wherein the memory block is part of the stack frame.

21. The method of claim 17, further comprising:

writing, by the second core, a result to the second procedure into a memory block in the cache of the second core, wherein the memory block is part of the stack frame; and implementing the cache coherence protocol to propagate the result from the cache of the second core to the cache of the first core.

22. The method of claim 17, wherein:

the instruction is a first instruction;

the program includes a third procedure; and the method further comprises:

while executing the first procedure, sending a second instruction, from the first core to a third core of the multi-core processor, wherein the second instruction commands the third core to execute the third procedure;

receiving the second instruction at the third core;

writing parameters for the third procedure into the memory block of the cache of the first core; and propagating the parameters for the third procedure into a cache of the third core to facilitate execution of the third procedure by the third core;

wherein executing the first procedure on the first core includes executing the first procedure on the first core while executing the third procedure on the third core.

* * * * *